(12) United States Patent
Chen

(10) Patent No.: US 7,301,880 B2
(45) Date of Patent: Nov. 27, 2007

(54) WRITE-ONCE OPTICAL DISC, AND METHOD AND APPARATUS FOR RECORDING/REPRODUCING MANAGEMENT INFORMATION ON/FROM OPTICAL DISC

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 606 days.

(21) Appl. No.: 10/928,663

(22) Filed: Aug. 27, 2004

(65) Prior Publication Data

US 2005/0025029 A1 Feb. 3, 2005

(30) Foreign Application Priority Data

Dec. 5, 2003 (TW) .............. 92134325 A

(51) Int. Cl.
*G11B 7/00* (2006.01)
(52) U.S. Cl. ............................. 369/112.03
(58) Field of Classification Search ........... 369/112.01, 369/112.02, 112.1, 112.03, 112.04, 44.23, 369/44.24
See application file for complete search history.

(56) References Cited

U.S. PATENT DOCUMENTS 5,734,637 A 3/1998 Ootaki et al. ............... 369/112

6,834,036 B1 * 12/2004 Shiono et al. ......... 369/112.03

FOREIGN PATENT DOCUMENTS

| CN | 99124458 | 7/2000 |
|---|---|---|
| CN | 1394335 A | 1/2003 |
| CN | 1129123 C | 11/2003 |
| CN | 1194346 C | 3/2005 |
| TW | 594225 | 6/2004 |

* cited by examiner

*Primary Examiner*—Nabil Hindi
(74) *Attorney, Agent, or Firm*—Morris Manning Martin LLP; Tim Tingkang Xia, Esq.

(57) ABSTRACT

An optical pickup head includes a light emitting and receiving unit (1), a first lens (2), a second lens (3), and a beam splitter (4). The light emitting and receiving unit (1) includes a semiconductor laser (10) generating laser beams with different wavelengths which irradiate an optical disk, and a photo detector (11) receiving laser beams reflected by the optical disk. The first lens faces the light emitting and receiving unit. The first lens includes an aspheric lens portion (20) with a pair of opposite surfaces, and a diffraction grating (21) formed on the surface of the aspheric lens portion which faces the light emitting and receiving unit. The second lens is similar to the first lens, and faces the optical disk for converging laser beams thereto. The beam splitter is located between the first and second lenses.

19 Claims, 2 Drawing Sheets

WRITE-ONCE OPTICAL DISC, AND METHOD AND APPARATUS FOR RECORDING/REPRODUCING MANAGEMENT INFORMATION ON/FROM OPTICAL DISC

BACKGROUND OF THE INVENTION

1. Field of the Invention

The present invention relates to an optical pickup head commonly used for two or more kinds of optical recording media, the optical pickup head employing laser beams having different wavelengths according to the different optical recording media.

2. Description of Prior Art

In recent years, various kinds of optical recording media such as Laser Disks (LDs), Compact Disks (CDs) and Digital Video Disks (DVDs) have been undergoing continued development. Each kind of optical recording medium is standardized according to unique specifications, such as the thickness of the disk substrate. This means that an optical pickup head which records information onto optical recording media or reproduces information from optical recording media should be compatible with the different kinds of optical recording media available.

For example, consumers nowadays require a player capable of reading out recorded information from both CD disks and DVD disks. The following are important differences between the standards of the CD format and the DVD format.

(1) The difference in applied wavelengths: the wavelength for CD disks is about 780 nm, and the wavelength for DVD disks is about 650 nm.

(2) The difference in numerical apertures (NAs): the numerical aperture for CD disks is 0.37, and the numerical aperture for DVD disks is 0.60.

(3) The difference in thicknesses of the disk substrate from a recording surface (reflection surface) to an outer surface of the optical recording medium: the thickness of the substrate for CD disks is 1.2 mm, and the thickness of the substrate for DVD disks is 0.60 mm.

Consequently, the optical pickup head of a CD/DVD compatible player must be able to adapt to these differences in order to be able to read information contained in both CD disks and DVD disks.

Conventionally, there are two kinds of optical pickup heads that are used in CD/DVD compatible players. In the first kind of optical pickup head, an independent optical system is provided therein for each of the two kinds of optical recording media. That is, the optical pickup head has at least two objective lenses: one for a CD disk and the other for a DVD disk. The major drawback of this kind of optical pickup head is that it needs too many optical elements, which makes it unduly large and costly. In the second kind of optical pickup head, a single optical system contains shared components which enable reading of both CD and DVD disks. This kind of optical pickup head reduces the number of optical elements and simplifies the overall configuration. However, the optical performance of the optical pickup head is limited. For example, an objective lens of the optical pickup head has a single focal point with a fixed numerical aperture. The objective lens is suitable for one kind of optical disk, say a CD disk; but is unsuitable for the other kind of optical disk, say a DVD disk. For the DVD disk, the objective lens produces aberrations such as spherical aberrations.

SUMMARY OF THE INVENTION

Accordingly, a main object of the present invention is to provide an optical pickup head which has a relatively simple configuration and which yields good optical performance for two kinds of optical recording media.

Another object of the present invention is to provide a method for manufacturing a lens which includes an aspheric lens portion and a diffraction grating having a zone plate.

To achieve the above main object, an optical pickup head in accordance with a preferred embodiment of the present invention comprises a light emitting and receiving unit, a first lens, a second lens, and a beam splitter. The light emitting and receiving unit includes a semiconductor laser generating laser beams with different wavelengths which irradiate an optical disk, and a photo detector receiving laser beams reflected by the optical disk. The first lens faces the light emitting and receiving unit. The first lens includes an aspheric lens portion with a pair of opposite surfaces, and a diffraction grating formed on the surface of the aspheric lens portion which faces the light emitting and receiving unit. The second lens faces the optical disk, for converging laser beams to the optical disk. The second lens includes an aspheric lens portion with a pair of opposite surfaces, and a diffraction grating formed on the surface of the aspheric lens portion which faces the optical disk. The beam splitter is located between the first and second lenses.

To achieve the above other object, a preferred method of the present invention for manufacturing a lens comprises:

(1) providing an aspheric lens portion preform having an aspheric surface and a planar surface opposite to the aspheric surface;

(2) chemically polishing the planar surface;

(3) depositing a first photoresist on the planar surface, and placing a first photomask over the first photoresist;

(4) exposing the first photoresist to radiation through the first photomask, removing corresponding portions of the first photoresist, etching exposed portions of the planar surface, and removing remaining portions of the first photoresist, thereby providing a plurality of first steps of a diffraction grating at the planar surface;

(5) essentially repeating step (3), but with a second photoresist being deposited on the planar surface having the first steps, and using a second photomask;

(6) essentially repeating step (4), but with exposed portions at the first steps being etched, thereby providing a plurality of second steps of the diffraction grating;

(7) essentially repeating step (5), but with a third photoresist being deposited on the planar surface having the first and second steps, and using a third photomask; and (8) essentially repeating step (6), but with exposed portions at the second steps being etched, thereby providing a plurality of third steps of the diffraction grating.

Other objects, advantages and novel features of the present invention will be drawn from the following detailed description of the preferred embodiment and method of the present invention with the attached drawings, in which:

DETAILED DESCRIPTION OF PREFERRED EMBODIMENT

Figure 1:
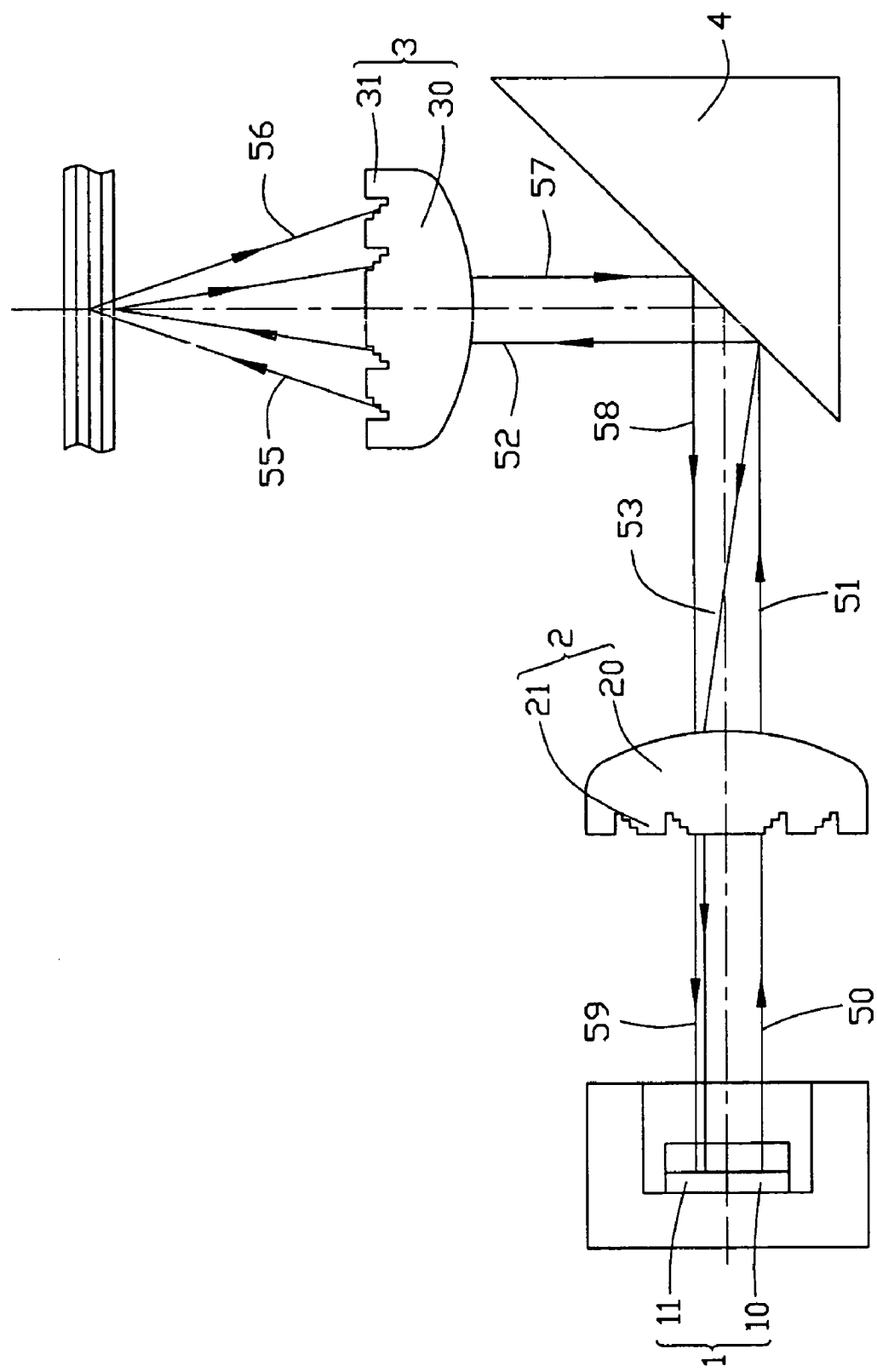
FIG. 1 is a schematic plan view of an optical pickup head in accordance with the present invention together with part of an optical disk, showing essential light paths of the optical pickup head.

Referring to FIG. 1, an optical pickup head (not labeled) for recording information onto an optical disk or reading information from the optical disk comprises a light emitting and receiving unit 1, a first lens 2, a second lens 3 and a beam splitter 4. The first lens 2 is a converging lens and adjoins the light emitting and receiving unit 1 to act as a collimator. The second lens is also a converging lens and faces the optical disk. The beam splitter 4 is located in an optical path between the first lens 2 and the second lens 3, for re-directing transmission of laser beams.

The light emitting and receiving unit 1 includes a semiconductor laser 10 disposed on a substrate (not labeled), and a photo detector 11 formed integrally with the substrate and abutting the semiconductor laser 10. The semiconductor laser 10 generates laser beams with different wavelengths to be employed as irradiation light beams. In a typical CD/DVD compatible player, the laser beams are emitted at two different wavelengths: about 650 nm for a DVD disk, and about 780 nm for a CD disk.

Figure 2:
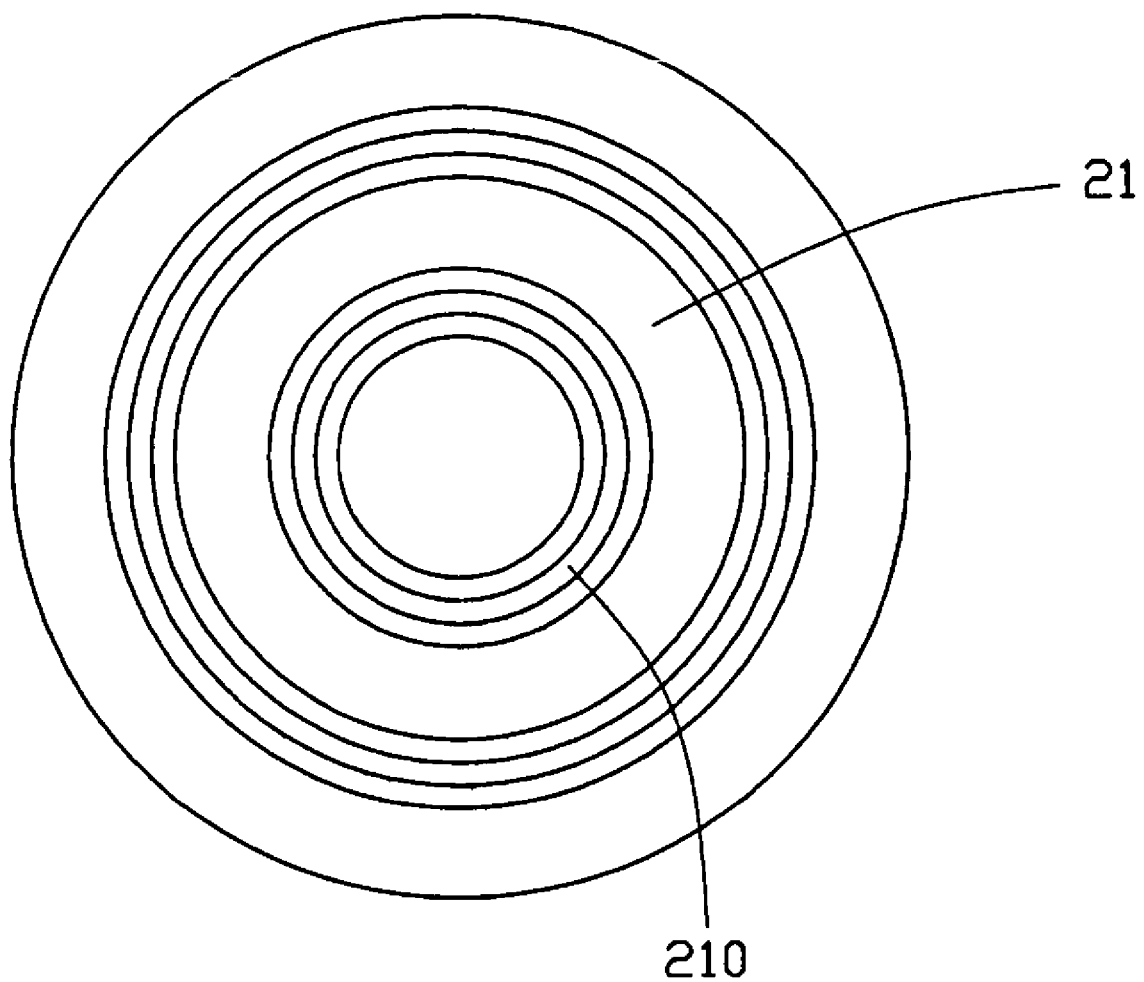
FIG. 2 is an enlarged, end elevation of a first lens of the optical pickup head of FIG. 1.

The first lens 2 includes an aspheric lens portion 20 with a pair of opposite surfaces (not labeled), and a diffraction grating 21 formed on the surface which faces the light emitting and receiving unit 1. The other surface of the aspheric lens portion 20 is aspheric. The diffraction grating 21 is an echelon grating, and is provided with a zone plate 210 for wavelength selectivity (see FIG. 2). The zone plate 210 comprises a plurality of concentric circular bands (not labeled), with each two adjoining bands having different light transmissivities. The diffraction grating 21 has at least 3 steps, for focusing the laser beams with different wavelengths onto different focal planes. Grating pitches of the zone plate 210 are determined in view of the NA and other indexes of the first lens 2 required for DVD format and CD format.

The second lens 3 has an aspheric lens portion 30 with a pair of opposite surfaces (not labeled), and a diffraction grating 31 formed on the surface which faces the optical disk. The other surface of the aspheric lens portion 30 is aspheric. The structures of the aspheric lens portion 30 and the diffraction grating 31 are basically the same as the structures of the aspheric lens portion 20 and the diffraction grating 21 of the first lens 2.

When the optical pickup head is recording or reading information, power from a power source (not shown) is supplied to the semiconductor laser 10, which outputs a laser beam 50 with a predetemined wavelength. The first lens 2 turns the laser beam 50 into a first parallel light beam 51, which transmits to the beam splitter 4. The beam splitter 4 splits the first parallel light beam 51 into two parts 52, 53. The part 52 is reflected to the second lens 3 for reading information from the optical disk. The part 53 is returned to the first lens 2 to impinge on a surface of the photo detector 11, so as to provide a reference signal applied to a tracking and focusing servo system. The aspheric lens portion 30 of the second lens 3 functions as an objective lens. That is, the aspheric lens portion 30 receives the part 52 and converts it into a convergent light beam 55 that transmits to the diffraction grating 31. In the case where the laser beam 50 has the wavelength of 650 nm, the convergent light beam 55 is transmitted through the diffraction grating 31 without any change, and is focused on a predetermined recording surface of the DVD disk. On the other hand, in the case where the laser beam 50 has the wavelength of 780 nm, the convergent light beam 55 is further converged by the diffraction grating 31, whereby it is precisely focused onto a predetermined recording surface of the CD disk.

The recording surface of the optical disk reflects the convergent light beam 55 as a return beam 56. The second lens 3 receives the return beam 56 and converts it into a second parallel light beam 57. The beam splitter 4 reflects the second parallel light beam 57 from the second lens 3 as a third parallel light beam 58, which transmits to the first lens 2. The aspheric lens portion 20 of the first lens 2 converts the third parallel light beam 58 into a convergent light beam 59, which transmits to the photo detector 11. In the case where the convergent light beam 59 has the wavelength of 650 nm, it is transmitted by the diffraction grating 21 unchanged, and is focused onto the surface of the photo detector 11. In the case where the convergent light beam 59 has the wavelength of 780 nm, it is further converged by the diffraction grating 21, whereby it is precisely focused onto the surface of the photo detector 11. Upon receiving the convergent light beam 59, the photo detector 11 outputs electrical signals accordingly.

Hence, any aberrations of the laser beams generated along the incident path and return paths are eliminated by the relatively simple configuration of the optical pickup head. Furthermore, the semiconductor laser 10 and the photo detector 11 adjoin each other in a single unified package. Therefore the incident path and the return path can share the same optical elements to thereby reduce the total number of optical elements needed. This further simplifies the configuration of the optical pickup head, to thus reduce its size and lower costs.

The first and second lenses 2, 3 having the aspheric lens portions 20, 30 and the diffraction gratings 21, 31 can be formed by injection molding, photolithography technology, or other suitable methods. In the case of injection molding, each of the first and second lenses 2, 3 is formed as follows. For brevity, formation of the first lens 2 only will be described. Firstly, a diffraction element is designed based on standard diffraction principles. The diffraction element is formed on a mold substrate according to a standard semiconductor manufacturing process. Secondly, a mold core needed to fabricate the diffraction grating 21 is formed on the substrate having the diffraction element by way of precision electroforming. Thirdly, a lens preform is produced by injection molding. Plastic molding processes and nanometer technology are employed in this process in order to obtain the desired level of precision. A material of the mold core is preferably nickel phosphorus (NiP) or a like material. A surface roughness of the mold core is preferably less than 4 nm, and a form tolerance is preferably less than 60 nm. A surface roughness and a form tolerance of the first lens 2 are preferably less than 20 nm and 600 nm respectively.

In the case of photolithography technology, the first and second lenses 2, 3 are formed as follows. For brevity, formation of the first lens 2 only will be described. Firstly, an aspheric lens portion preform having a pair of opposite surfaces is provided. One of the surfaces is aspheric, and the other surface is planar. Secondly, the planar surface is polished by way of chemical polishing or another suitable method. Thirdly, a photoresist is deposited on the planar surface, and a photomask is placed over the photoresist. The photoresist is exposed to radiation through the photomask, and then corresponding portions of the photoresist are removed. Fourthly, exposed portions of the planar surface are chemically etched. Then remaining portions of the photoresist are removed, thereby providing a plurality of first steps of the diffraction grating 21 in the planar surface.

Finally, the above-described processes for forming the first steps are essentially repeated to form a plurality of second steps and then a plurality of third steps of the diffraction grating 21.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. An optical pickup head comprising:
   a light emitting and receiving unit including a semiconductor laser generating laser beams with different wavelengths which propagate to an optical disk, and a photo detector receiving laser beams reflected by the optical disk;
   a first lens facing the light emitting and receiving unit, and including an aspheric lens portion with a pair of opposite surfaces and a diffraction grating formed at the surface of the aspheric lens portion which faces the light emitting and receiving unit; and
   a second lens facing the optical disk for converging laser beams to the optical disk.

2. The optical pickup head in accordance with claim 1, wherein the diffraction grating includes a zone plate that has a plurality of concentric circular bands, each two adjoining concentric circular bands having different light transmissivities.

3. The optical pickup head in accordance with claim 1, wherein the diffraction grating is an echelon grating with at least three steps.

4. The optical pickup head in accordance with claim 1, wherein the laser beams comprise two different wavelengths, one of about 650 nm for a DVD (Digital Video Disk) disk, and the other of about 780 nm for a CD (Compact Disk) disk.

5. The optical pickup head in accordance with claim 4, wherein the diffraction grating transmits laser beams with the wavelength of about 650 nm without any change, and converges laser beams with the wavelength of about 780 nm.

6. The optical pickup head in accordance with claim 1, wherein the semiconductor laser and the photo detector adjoin each other in a single unified package.

7. The optical pickup head in accordance with claim 1, wherein the second lens includes an aspheric lens portion with a pair of opposite surfaces, and a diffraction grating formed at one of the surfaces.

8. The optical pickup head in accordance with claim 7, wherein the diffraction grating of the second lens faces the optical disk.

9. The optical pickup head in accordance with claim 7, wherein the other surface of the aspheric lens portion of the second lens is aspheric.

10. The optical pickup head in accordance with claim 7, wherein the diffraction grating of the second lens includes a zone plate having a plurality of concentric circular bands, each two adjoining concentric circular bands having different light transmissivities.

11. The optical pickup head in accordance with claim 7, wherein the diffraction grating of the second lens is an echelon grating with at least three steps.

12. The optical pickup head in accordance with claim 7, further comprising a beam splitter between the first lens and the second lens.

13. The optical pickup head in accordance with claim 1, wherein the other surface of the aspheric lens portion of the first lens is aspheric.

14. An arrangement for an optical pickup head, comprising:
   a light emitting and receiving unit including a semiconductor laser generating laser beams with different wavelengths to irradiate onto an optical disk;
   a lens set disposed in a path of said generated laser beams, and including a first diffraction grating surface facing said light emitting and receiving unit and a second diffraction grating surface facing said optical disk; and
   at least two aspheric lens portions spaced from each other and disposed in said path between said first and second diffraction grating surfaces.

15. The arrangement of claim 14, wherein said light emitting and receiving unit further comprises a photo detector to receive reflected laser beams.

16. The arrangement of claim 14, wherein said first diffraction grating surface is integrally formed on one of said at least two aspheric lens portions, and said second diffraction grating surface is integrally formed on the other of said at least two aspheric lens portions.

17. The arrangement of claim 14, further comprising a beam splitter disposed between said at least two aspheric lens portions to reflect said laser beams along at least two directions.

18. An arrangement for an optical pickup head, comprising:
   a light emitting and receiving unit including a semiconductor laser generating laser beams with different wavelengths to irradiate onto an optical disk;
   a lens set disposed in a path of said generated laser beams, and including a first diffraction grating surface facing said light emitting and receiving unit, said first diffraction grating surface comprising diffraction gratings each of which is an echelon grating with at least three steps; and
   at least two aspheric lens portions spaced from each other and disposed in said path between said first diffraction grating surface and said optical disk.

19. The arrangement of claim 18, further comprising a second diffraction grating surface disposed in said path between said at least two aspheric portions and said optical disk, and facing said optical disk.

* * * * *